United States Patent
Scheidling et al.

(10) Patent No.: US 6,629,472 B2
(45) Date of Patent: Oct. 7, 2003

(54) ADJUSTABLE PEDAL FOR VEHICLES

(75) Inventors: Matthias Scheidling, Freiberg (DE); Gunther Siebdraht, Chemnitz (DE)

(73) Assignee: United Parts FHS Automobil Systeme GmbH, Dassel (DE)

( * ) Notice: Subject to any disclaimer, the term of this patent is extended or adjusted under 35 U.S.C. 154(b) by 0 days.

(21) Appl. No.: 09/771,738

(22) Filed: Jan. 29, 2001

(65) Prior Publication Data

US 2001/0015110 A1 Aug. 23, 2001

(30) Foreign Application Priority Data

Jan. 27, 2000 (DE) .......................... 100 03 577

(51) Int. Cl.⁷ ................................. G05G 1/16
(52) U.S. Cl. .......................... 74/512; 74/560
(58) Field of Search ............... 74/512–514, 560–563

(56) References Cited

U.S. PATENT DOCUMENTS

| | | | | |
|---|---|---|---|---|
| 3,541,881 A | * | 11/1970 | Pharis | 74/512 |
| 5,632,183 A | * | 5/1997 | Rixon et al. | 74/560 |
| 5,884,532 A | * | 3/1999 | Rixon et al. | 74/562 |
| 6,151,986 A | * | 11/2000 | Willemsen et al. | 74/512 |
| 6,212,970 B1 | * | 4/2001 | Bortolon | 74/560 |
| 6,314,831 B2 | * | 11/2001 | Rixon et al. | 74/512 |
| 6,360,629 B2 | * | 3/2002 | Schambre et al. | 74/513 |

* cited by examiner

*Primary Examiner*—Chong H. Kim
(74) *Attorney, Agent, or Firm*—Cohen, Pontani, Lieberman & Pavane

(57) ABSTRACT

The invention relates to an adjustable pedal for vehicles and implements, comprising the pedal tread and the pedal arm together with devices for holding connections for the actuating links and for mounting the pedal on the pedal bracket, in which the pedal on the pedal bracket comprises a plurality of parts which can be moved relative to one another and by which the distance between the pedal tread and the mount can be adjusted. The pedal tread is mounted and held displaceably on the pedal by means of a pedal guide comprising two sections, one of which can be displaced into the other. The solution according to the invention enables the pedal tread to be adjusted in a simple manner with a high degree of safety for the driver with the cost in terms of material and weight being small.

13 Claims, 4 Drawing Sheets

ADJUSTABLE PEDAL FOR VEHICLES

BACKGROUND OF THE INVENTION

1. Field of the Invention

The invention relates to an adjustable pedal for vehicles and machines which can be adjusted to take into account differences in height of individuals who operate and/or drive the machines and vehicles.

The invention can be used wherever a pedal in vehicles, in particular in motor vehicles or on machines, is to be adjusted in the direction of the operator or driver of the vehicle.

2. Description of the Related Art

The distance between the seat and the pedal of vehicles or machines having operators has to be set in accordance with the height of the operator or the driver of the vehicle. One possibility for this is, for example, to adjust the seats in vehicles. The driver is therefore brought closer to the pedal and, in accordance with his size, is able to safely reach and maneuver the pedal. However, being moved toward the pedal also means that the distance from the steering wheel is smaller. Investigations of accidents have shown that too short a distance from the steering wheel may result in severe injuries when the air bag is triggered. In addition, sitting too close to the steering wheel substantially restricts comfort and leads to fatigue and cramp.

There is therefore the attempt to find possibilities of designing the pedal such that it can be adjusted toward the driver. In principle, various solutions are known to this effect.

U.S. Pat. No. 5,884,532 and U.S. Pat. No. 5,855,143 disclose pedal devices which can be adjusted in the direction of the driver by means of pivoting systems. In addition to having a relatively high weight, these systems also have relatively large installation dimensions and so they are not suitable for installation in all types of passenger vehicles.

U.S. Pat. Nos. 4,875,385; 5,819,588; 4,989,474 and 5,722,302 disclose systems in which the pedal is fastened to a device permitting displacement transversely to the pedal along a shaft in the direction of the driver. These devices have the disadvantage that internal components protrude in the direction of the driver and constitute an additional source of injury during accidents. The displacement in the direction of the driver means that the pedal also does not have ergonomically favorable positions in all settings for drivers of differing size.

A further possibility for adjusting the pedal is disclosed in U.S. Pat. No. 5,964,125. This patent describes fixing of the pedal in various positions around a rotating shaft, about which it can be pivoted. Even this proposal means that unfavorable foot positions for drivers of a certain size cannot be avoided, since the pedal takes up different distances from the floor on account of its curved movement.

SUMMARY OF THE INVENTION

The object of the invention, therefore, is to develop a pedal with which the distance between the driver's seat and the pedal can be adjusted with a high degree of safety and comfort for the driver with the increase in weight and space required in the vehicle being small.

The solution according to the invention makes provision for the adjustable pedal for vehicles and implements, comprising the pedal tread and the pedal arm together with devices for holding connections for the actuating links and for mounting the pedal on the pedal bracket, to comprise a plurality of parts which can be moved relative to one another and by which the distance between the pedal tread and a pedal mounting can be adjusted. The adjustability takes place over a curved path in such a manner that the distance of the pedal from the floor can always be matched to the size of the particular driver.

An essential feature of the invention is that the pedal tread is mounted and held displaceably on the pedal by means of a pedal arm and pedal guide comprising two sections, one of which can be displaced into the other.

It is advantageous if the pedal arm has serrations arranged on it in which drive members such as teeth of a conveying worm engage and undertake the movement thereof. Other self-locking drive members, for example, a spur gear, are also conceivable instead of a conveying worm. The drive members are arranged in an actuating drive.

It is furthermore advantageous for the pedal tread to be arranged on the pedal arm together with drive members which are in the form of a chain or a Bowden cable and undertake the movement of the pedal arm. This solution may be regarded as an alternative to the actuating drive using gears and teeth, in particular whenever the pedal arm has a curve.

It is furthermore advantageous for the pedal arm together with the pedal tread to be automatically adjusted by means of a servomotor. The actuating drive may be arranged within or outside the passenger compartment.

The pedal guide can constitute a plastic part and the pedal arm can constitute a metal part, or both components can be manufactured from metal or plastic.

The driving element arranged on the pedal guide can be connected to a servomotor by means of a flexible drive shaft.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
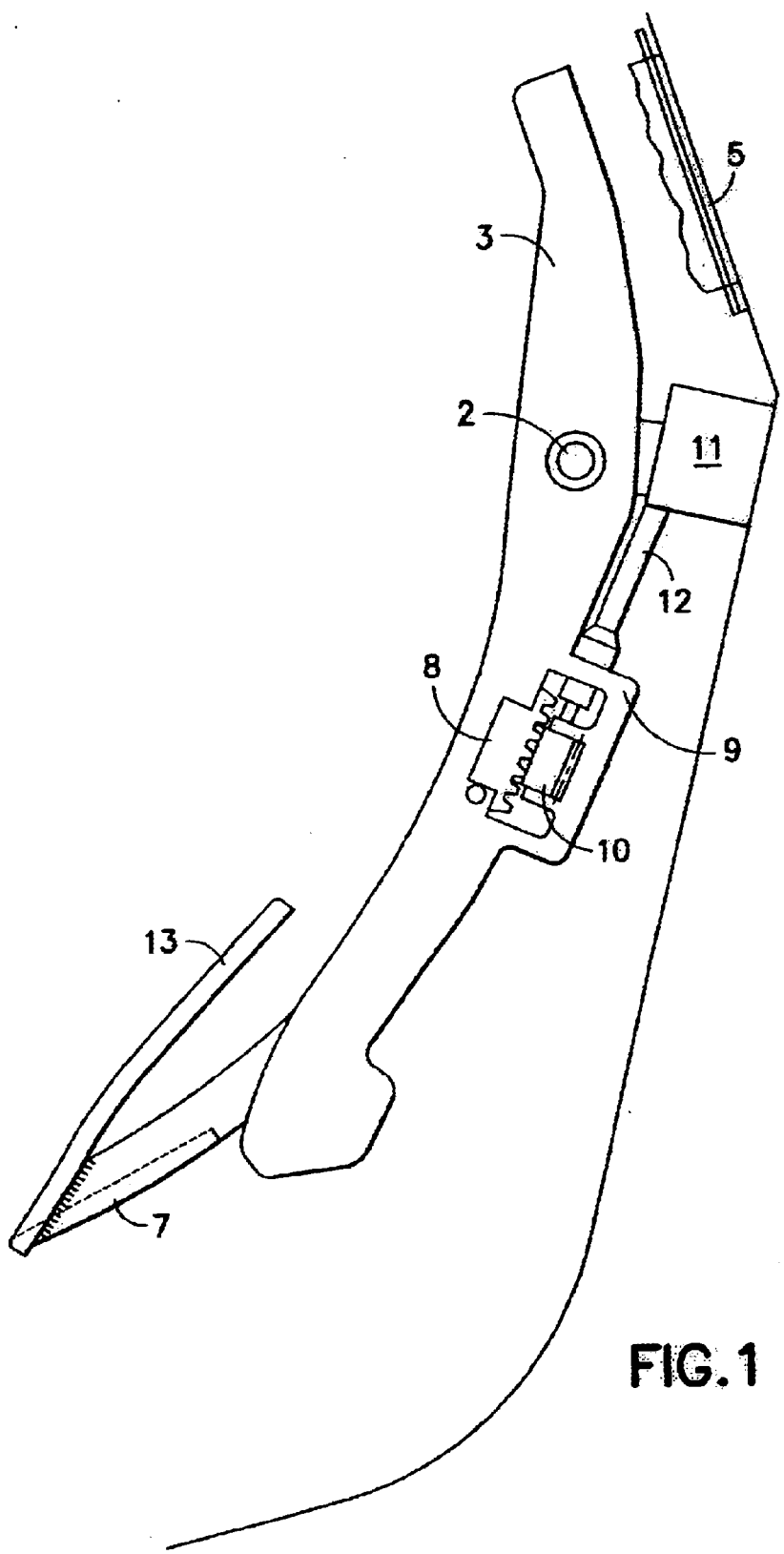
FIG. 1 shows a pedal according to the invention in side view.
Figure 2:
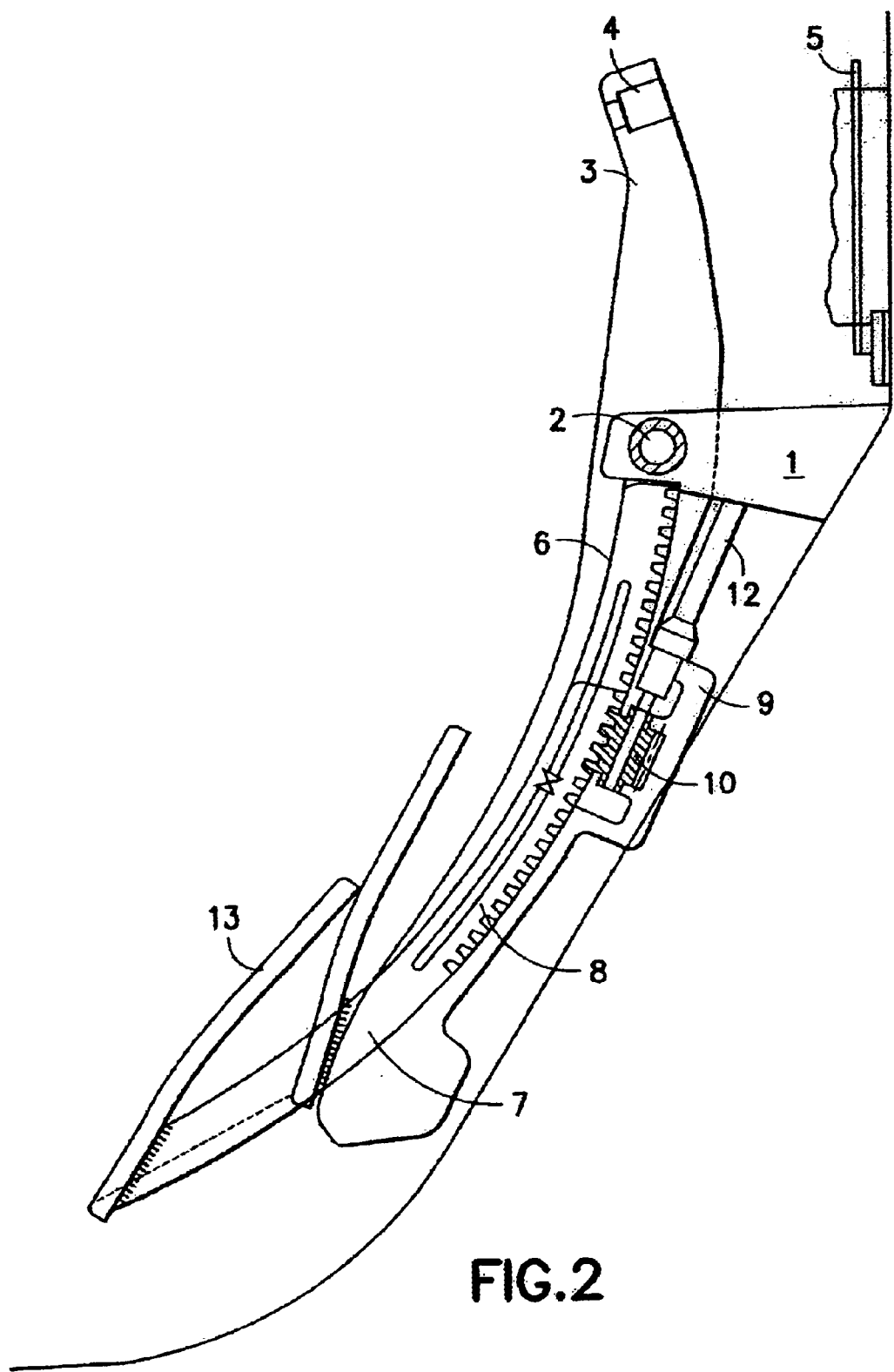
FIG. 2 shows a pedal according to the invention in side view in two positions with the pedal tread pressed in the operating state.
Figure 3:
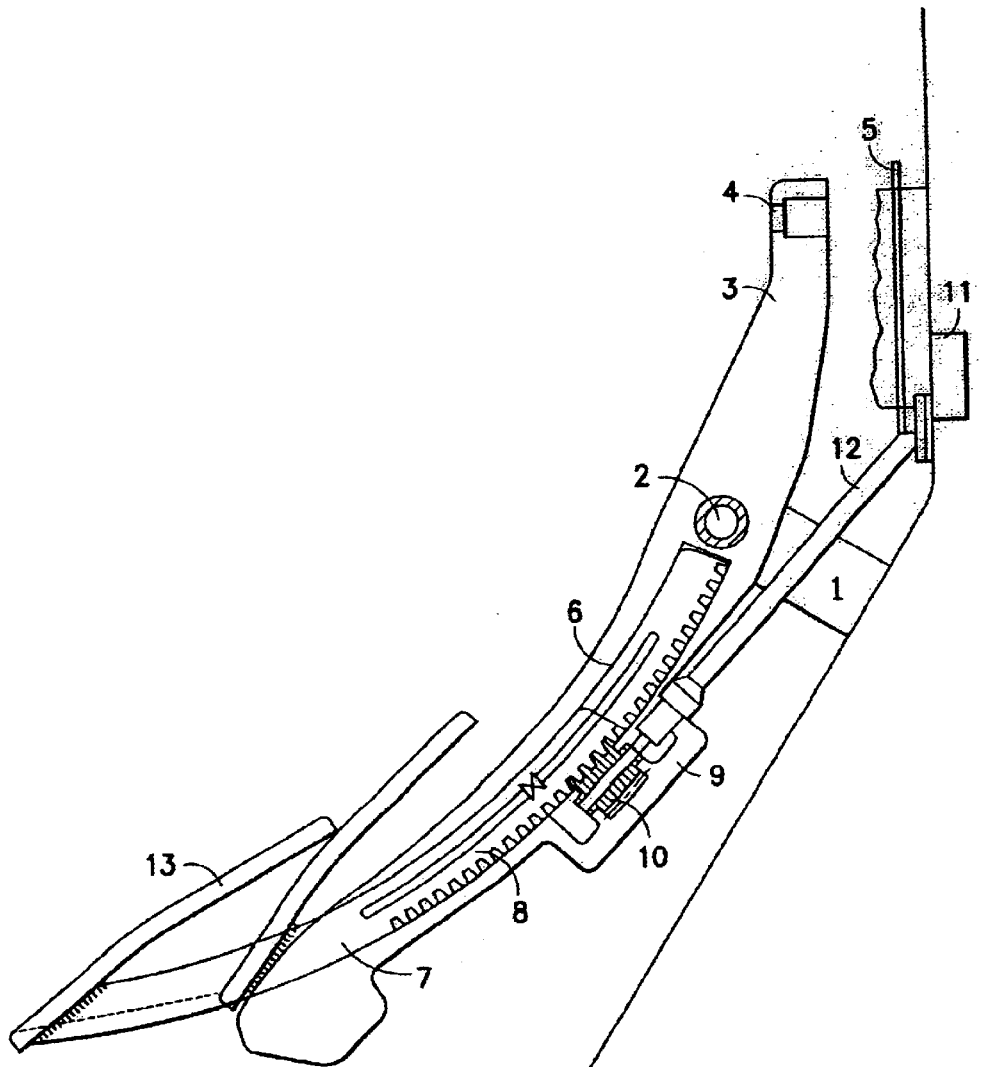
FIG. 3 shows a pedal according to the invention in side view in two positions with the pedal tread not pressed in the operating state.

FIG. 1 shows the pedal 3 according to the invention in side view, comprising the pedal 3, which is fastened at a pedal mounting location to the pedal bracket 1 (FIG. 2) by means of a mounting bolt 2. A mount 4 (FIG. 2) for the Bowden cables can be arranged at the upper end of the pedal 3. The pedal stop 5, which is arranged opposite said mount, cushions the movements of the pedal 3 with respect to the vehicle body. As shown in FIG. 2, a pedal arm guide 6 is arranged in the lower part of the pedal 3 and the pedal arm 7, which can be displaced in the longitudinal direction and at whose end the pedal treadpiece 13 is situated, is fixed in the said guide. The distance between the pedal treadpiece 13 and the pedal mounting can be changed by pulling said pedal arm 7 out or pushing it into the pedal arm guide 6, which can be seen in FIGS. 2 and 3. In order to be able to change its effective length automatically, the pedal arm 7 is provided in its upper part with drive members in the form of teeth 8 of a rack. Engaging in these teeth 8 of the rack are the teeth of the conveying worm gear 10, which is driven in a self-locking manner by means of a servomotor 11, via a drive shaft 12. The servomotor 11 can be arranged within (FIG. 1) or outside (FIG. 3) the passenger compartment. The conveying worm gear 10 together with its drive teeth is arranged in a drive element 9. A slot 14 in the pedal arm 7, into which a screw protrudes, is used for guiding the pedal arm 7. This slot can be seen in particular in FIGS. 2 and 3 and furthermore serves for limiting the displacement of the pedal arm 7.

Figure 4:
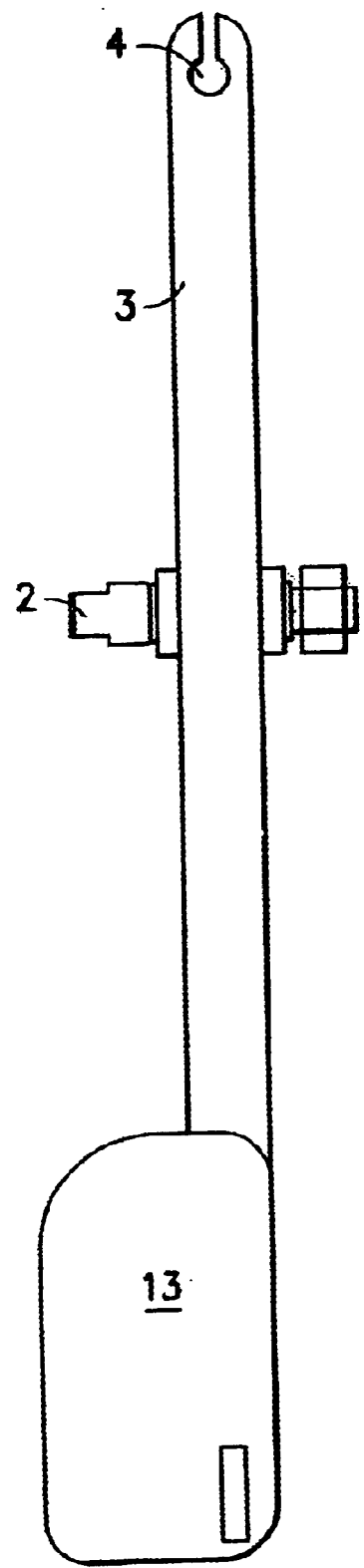
FIG. 4 shows a view of a pedal according to the invention.

FIG. 4 shows a view of the pedal 3 according to the invention together with the pedal treadpiece 13.

The solution according to the invention has the advantage that the pedal treadpiece 13 can be adjusted in a simple manner with a high degree of safety for the driver with the cost in terms of material and weight being small.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An adjustable pedal for vehicles and implements, comprising:
   a pedal extending in a longitudinal direction;
   a bracket at a pedal mounting location;
   a mounting member for mounting the pedal to the bracket;
   a pedal arm, said pedal arm being movably carried at a lower end of said pedal; and
   a pedal treadpiece affixed to said pedal arm, said pedal arm being linearly movable on said pedal in the longitudinal direction toward and away from the mounting member for correspondingly altering a distance between said pedal treadpiece and said mounting location, the longitudinal direction being arcuate.

2. An adjustable pedal according to claim 1, further comprising a pedal guide, said pedal arm being connected with said pedal guide to move in each of opposite longitudinal directions on said pedal guide.

3. An adjustable pedal according to claim 1, wherein said pedal arm comprises a rack having toothed serrations, and
   a driving member engagable with said serrations for moving said pedal arm on said pedal guide.

4. An adjustable pedal according to claim 3, wherein said driving member is a gear.

5. An adjustable pedal according to claim 4, wherein said gear is a worm gear.

6. An adjustable pedal according to claim 3, wherein said driving member is operated by a servomotor.

7. An adjustable pedal according to claim 2, wherein one of said pedal guide and said pedal arm is a plastic part, another of said pedal guide and said pedal arm being a metal part.

8. An adjustable pedal according to claim 2, wherein said pedal guide and said pedal arm are plastic parts.

9. An adjustable pedal according to claim 2, wherein said pedal guide and said pedal arm are metal parts.

10. The adjustable pedal of claim 1, wherein the pedal defines an arcuate path extending along the longitudinal direction for guiding movement of the pedal arm in the longitudinal direction in the pedal.

11. The adjustable pedal of claim 10, wherein the path extends from a first end at the lower end of the pedal to a second end, a projection of the path past the second end at least partially intersecting said mounting member.

12. The adjustable pedal of claim 10, wherein said pedal arm comprises an elongate piece extending through the arcuate path defined in the pedal.

13. The adjustable pedal of claim 1, wherein the pedal arm is movable along a curved path relative to the pedal such that a distance of the pedal from a floor below the pedal is matched to a size of a driver of the vehicle as the pedal arm is moved along the curved path.

\* \* \* \* \*

UNITED STATES PATENT AND TRADEMARK OFFICE
CERTIFICATE OF CORRECTION

PATENT NO. : 6,629,472 B2  
DATED : October 7, 2003  
INVENTOR(S) : Matthias Scheidling It is certified that error appears in the above-identified patent and that said Letters Patent is hereby corrected as shown below:

<u>Title page,</u>  
Item [75], Inventors, second inventor should read -- Gunter Siebdrath --

Signed and Sealed this

Seventeenth Day of August, 2004

JON W. DUDAS  
*Acting Director of the United States Patent and Trademark Office*